United States Patent
Her (10) Patent No.: US 12,527,653 B2
(45) Date of Patent: Jan. 20, 2026

(54) RIDGED DENTAL FLOSS

(71) Applicant: Cheemang Her, Woodbury, MN (US)

(72) Inventor: Cheemang Her, Woodbury, MN (US)

(*) Notice: Subject to any disclaimer, the term of this patent is extended or adjusted under 35 U.S.C. 154(b) by 452 days.

(21) Appl. No.: 17/994,845

(22) Filed: Nov. 28, 2022

(65) Prior Publication Data
US 2024/0173111 A1    May 30, 2024

(51) Int. Cl.
*A61C 15/04* (2006.01)

(52) U.S. Cl.
CPC .......... *A61C 15/042* (2013.01); *A61C 15/043* (2013.01)

(58) Field of Classification Search
CPC .................................................. A61C 15/042
See application file for complete search history.

(56) References Cited

U.S. PATENT DOCUMENTS

| | | | |
|---|---|---|---|
| 3,511,249 A | 5/1970 | Baitz | |
| 5,063,948 A | 11/1991 | Lloyd | |
| 5,167,753 A | 12/1992 | McCullough et al. | |
| 5,316,028 A * | 5/1994 | Flemming | A61C 15/042 132/321 |
| 5,545,480 A * | 8/1996 | Lalani | A61C 15/042 428/399 |
| 5,896,867 A | 4/1999 | McGaha et al. | |
| 6,112,753 A * | 9/2000 | Arsenault | A61C 15/042 132/321 |
| 7,281,541 B2 | 10/2007 | Lorch | |
| 8,539,966 B2 | 9/2013 | Ochs et al. | |
| 2008/0314406 A1 | 12/2008 | Barrie | |
| 2015/0122281 A1 | 5/2015 | Martens | |
| 2015/0272711 A1 | 10/2015 | Gagan | |

FOREIGN PATENT DOCUMENTS

| | | | | |
|---|---|---|---|---|
| DE | 102007009949 A1 * | 9/2007 | ......... | A61C 15/042 |
| WO | 9740775 | 11/1997 | | |
| WO | WO-2015012246 A1 * | 1/2015 | ......... | A61C 15/042 |

OTHER PUBLICATIONS

DE 102007009949 A1 (Schroeder Ludger, Martin Tobias) Dental floss, for cleaning the gaps between teeth . . . , Sep. 2007—0630 [retrieved on Mar. 25, 2025]. Translation retrieved from: Espacenet (Year: 2007).*

(Continued)

*Primary Examiner* — Eric J Rosen
*Assistant Examiner* — Courtney N Huynh
(74) *Attorney, Agent, or Firm* — Johnson | Dalal; Mark C. Johnson (57) ABSTRACT

A ridged dental floss that includes a flexible dental floss string of a polymeric material that includes multiple sections of ridges, wherein a first section includes a tightly spaced series of spherical ridges each of an elastic polymeric material and directly coupled to opposing sides of the dental floss string to define a diameter and a second section adjacent to the first section includes a tightly spaced series of spherical ridges each of an elastic polymeric material and directly coupled to opposing sides of the dental floss string to define a diameter, wherein the diameters of each of the tightly spaced series of spherical ridges in the second section are greater than the diameters of each of the tightly spaced series of spherical ridges in the first section.

16 Claims, 4 Drawing Sheets

(56) References Cited

OTHER PUBLICATIONS

Is Silicone Dishware Safe [online]. MightyNest, Mar. 21, 2011, 3 pages. [retrieved on Mar. 25, 2025]. Retrieved from the Internet: <URL: https://mightynest.com/articles/is-silicone-safe>. (Year: 2011).*
WO 2015012246 A1 (Tateya Daisaku) Interdental Cleaning Tool, Jan. 29, 2015 [retrieved on Sep. 8, 2025]. Translation retrieved from: Espacenet (Year: 2015).*

* cited by examiner

RIDGED DENTAL FLOSS

FIELD OF THE INVENTION

The present invention relates generally to dental floss and, more particularly, relates to dental floss having a plurality of ridges formed thereon.

BACKGROUND OF THE INVENTION

Dental care and maintenance are performed by a significant number of individuals. Flossing is widely regarded as a required process for healthy and effective dental care. Dental floss is predominantly embodied in a cord or string of thin filaments used in interdental cleaning to remove material (e.g., food) and/or dental plaque from between teeth or places a toothbrush usually has difficulty reaching or is unable to reach. Because of the different configurations of many users' teeth or, said another way, the teeth space and size differences that vary between any given individual, conventional floss is often incapable of effectively and efficiently satisfying its intended purposes.

Some known dental floss assemblies, e.g., like the floss described and embodied in Arsenault, U.S. Pat. No. 6,112,753, utilize spaced spherical protuberances along the length of a piece of floss string that are designed to increase the ability of users to remove unwanted material between a user's teeth and also for the user to hold the piece of floss. These known pieces of floss, however, fail to address the concern of being adapted to accommodate the space and size differences that vary between any given individual. These known pieces of dental floss are also commercially difficult and/or impracticable to utilize in conventional floss packaging because of their configuration and size.

Therefore, a need exists to overcome the problems with the prior art as discussed above.

SUMMARY OF THE INVENTION

The invention provides ridged dental floss that overcomes the hereinafore-mentioned disadvantages of the heretofore-known devices and methods of this general type and that is effectively and efficiently adapted to accommodate space and size differences among most individuals and is able to be packaged in a safe, efficient, and cost-effective manner.

With the foregoing and other objects in view, there is provided, in accordance with the invention and in combination with a dental floss container housing a roll of flexible dental floss string having a distal end, a proximal end opposing the distal end of the dental floss string, and a string length separating the distal and proximal ends of the dental floss string, an improvement that includes a first section along the string length with a tightly spaced series of spherical ridges each of an elastic polymeric material and directly coupled to opposing sides of the dental floss string to define a diameter, a second section along the string length with a tightly spaced series of spherical ridges each of an elastic polymeric material and directly coupled to opposing sides of the dental floss string to define a diameter, wherein the diameters of each of the tightly spaced series of spherical ridges in the second section are greater than the diameters of each of the tightly spaced series of spherical ridges in the first section, and a third section along the string length with a tightly spaced series of spherical ridges each of an elastic polymeric material and directly coupled to opposing sides of the dental floss string to define a diameter, wherein the diameters of each of the tightly spaced series of spherical ridges in the third section are greater than the diameters of each of the tightly spaced series of spherical ridges in the second section and the first, second, and third sections are adjacent to at least one of each other.

In accordance with another feature, an embodiment of the present invention includes two opposing lines of demarcation flanking the first, second, and third sections.

In accordance with a further feature of the present invention, each of the two opposing lines of demarcation are spatially offset a length of at least 40 mm from any one of the first, second, and third sections.

In accordance with an additional feature of the present invention, the two opposing lines of demarcation define a first flossing segment forming a portion of a plurality of flossing segments formed on a roll of flexible dental floss string.

In accordance with yet another feature of the present invention, wherein the diameters of each of the tightly spaced series of spherical ridges in the first section get progressively larger for each spherical ridge in the series, wherein the diameters of each of the tightly spaced series of spherical ridges in the second section get progressively larger for each spherical ridge in the series, and wherein the diameters of each of the tightly spaced series of spherical ridges in the third section get progressively larger for each spherical ridge in the series.

In accordance with a further feature of the present invention, the diameters of each of the tightly spaced series of spherical ridges in the first section range from 0.05-0.50 mm, the diameters of each of the tightly spaced series of spherical ridges in the second section range from 0.63-1.13 mm, and the diameters of each of the tightly spaced series of spherical ridges in the third section range from 1.25-1.75 mm.

In accordance with an exemplary feature of the present invention, the first, second, and third sections each have six tightly spaced spherical ridges directly coupled to opposing sides of the dental floss string.

In accordance with a further feature of the present invention, the three to six spherical ridges are tightly spaced 10-15 mm from one another.

In accordance with an additional feature of the present invention, the first, second, and third sections are spaced 20-30 mm from one another.

In accordance with a further feature of the present invention, the spherical ridges on the first, second, and third sections are each of hypoallergenic silicone.

Also in accordance with the present invention, a ridged dental floss is disclosed that includes a flexible dental floss string of a polymeric material and having a distal end, a proximal end opposing the distal end of the dental floss string, and a string length separating the distal and proximal ends of the dental floss string, a first section 108a along the string length with a tightly spaced series of spherical ridges each of an elastic polymeric material and directly coupled to opposing sides of the dental floss string to define a diameter, and a second section along the string length with a tightly spaced series of spherical ridges each of an elastic polymeric material and directly coupled to opposing sides of the dental floss string to define a diameter, wherein the diameters of each of the tightly spaced series of spherical ridges in the second section are greater than the diameters of each of the tightly spaced series of spherical ridges in the first section and the first and second sections are disposed in an adjacent configuration with one another.

In accordance with another feature, an embodiment of the present invention includes a third section along the string length with a tightly spaced series of spherical ridges each of an elastic polymeric material and directly coupled to opposing sides of the dental floss string to define a diameter, wherein the diameters of each of the tightly spaced series of spherical ridges in the third section are greater than the diameters of each of the tightly spaced series of spherical ridges in the second section and the first, second, and third sections are adjacent to at least one of each other.

Although the invention is illustrated and described herein as embodied in a ridged dental floss assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the dental floss. The term "series" is defined herein to mean having two or more ridges coming one after another in spatial succession.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient ridged dental floss assembly that is widely applicable to many individuals having teeth with different shapes, sizes, and spacing. Referring now to FIGS. 1-4, one embodiment of the present invention is shown. FIGS. 1-4, along with the other figures depicted herein, show several advantageous features of the present invention, but, as will be described below, the invention can be provided in several shapes, sizes, combinations of features and components, and varying numbers and functions of the components. More specifically, the ridged dental floss 100 can be seen having a plurality of sections 108a-n with a plurality of elastic ridges 110a-n coupled thereto of varying sizes, wherein "n" is any number greater than one. To have a cost-effective and practical dental floss assembly that is compact and enables the versatility desired by the present invention, the dental floss 100 includes three sections 108a-c that form a segment of a plurality of segments formed on the dental floss string 102, wherein a segment may be selectively removed from the dental floss 100 for use a by a user.

Figures 1, 2:
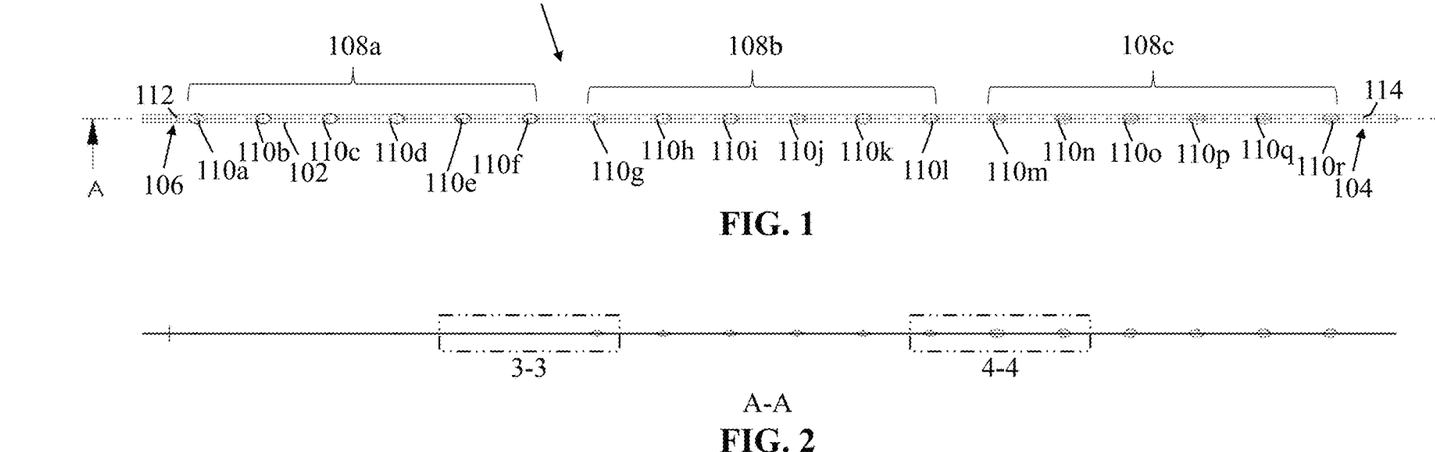
FIG. 1 is a top plan view of ridged dental floss in accordance with one embodiment of the present invention.
FIG. 2 is a sectional view, along section line A-A, of the ridged dental floss in FIG. 1.
Figures 7, 8:
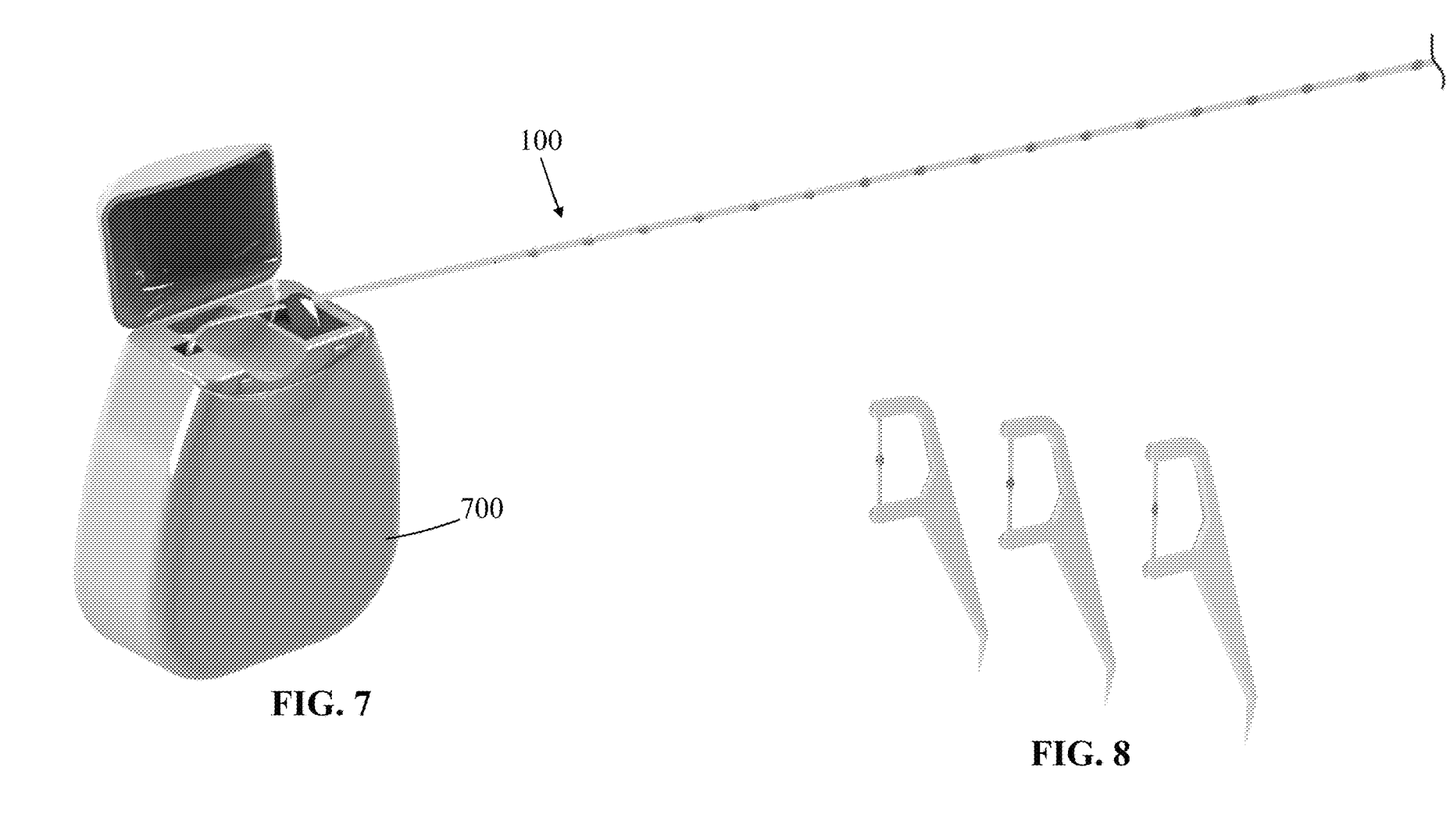
FIG. 7 is a perspective view of ridged dental floss housed in a floss container in accordance with one embodiment of the present invention.
FIG. 8 are perspective views of a handheld floss member having a piece of ridged floss in accordance with one embodiment of the present invention.

More specifically, with reference briefly to FIG. 1 in combination with FIG. 7, the dental floss 100, which includes the dental floss string 102 with the plurality of various sized ridges 110*a-n*, may be formed in a roll that is housed in a dental floss container 700. The dental floss container 700 may include conventional components and functionality known to those of skill int the art (e.g., a metallic prong utilized to selectively remove a segment for use by a user, a hole for the dental floss string 102 to be removed from the container 700, etc.).

The dental floss string 102 is of a flexible material having a distal end 104 (which may be the terminal end), a proximal end 106 (which may be the terminal end) opposing the distal end 104 of the dental floss string 102, and a string length separating the distal and proximal ends 104, 106 of the dental floss string 102. The dental floss string 102 may be comprised of a polymeric material such as nylon or expanded polytetrafluoroethylene (PTFE), but generally has a low coefficient of friction relative to a user's teeth. In one embodiment, the distal and proximal ends 104, 106 may refer to the terminal ends of a segment of the dental floss string 102.

The dental floss string 102 can be seen having a first section 108*a* along the string length with a tightly spaced series of spherical ridges 110*a-f* each of an elastic polymeric material and directly coupled to opposing sides of the dental floss string 102 to define a diameter. Said another way, the dental floss string 102 may have a front face or surface and an opposing rear face or surface that may be substantially planar (as is most conventional floss strings) and that includes symmetric ridges on the front and rear faces of the string 102. It should be understood that terms such as, "front," "rear," "side," top," "bottom," and the like are indicated from the reference point of a viewer viewing the dental floss string shown in FIG. 1. Each ridge 110*a-r* disposed on a face or side of the string 102 may form a spherical shape, i.e., a convex and/or curved shape, that is configured to deform upon experiencing pressure from one or both sides of a user's teeth. The ridges 110*a-r* can be seen forming a hemi-spherical shape on one side of the dental floss string 102 and a corresponding and aligned hemi-spherical shape on the other side of the dental floss string 102.

Figure 6:
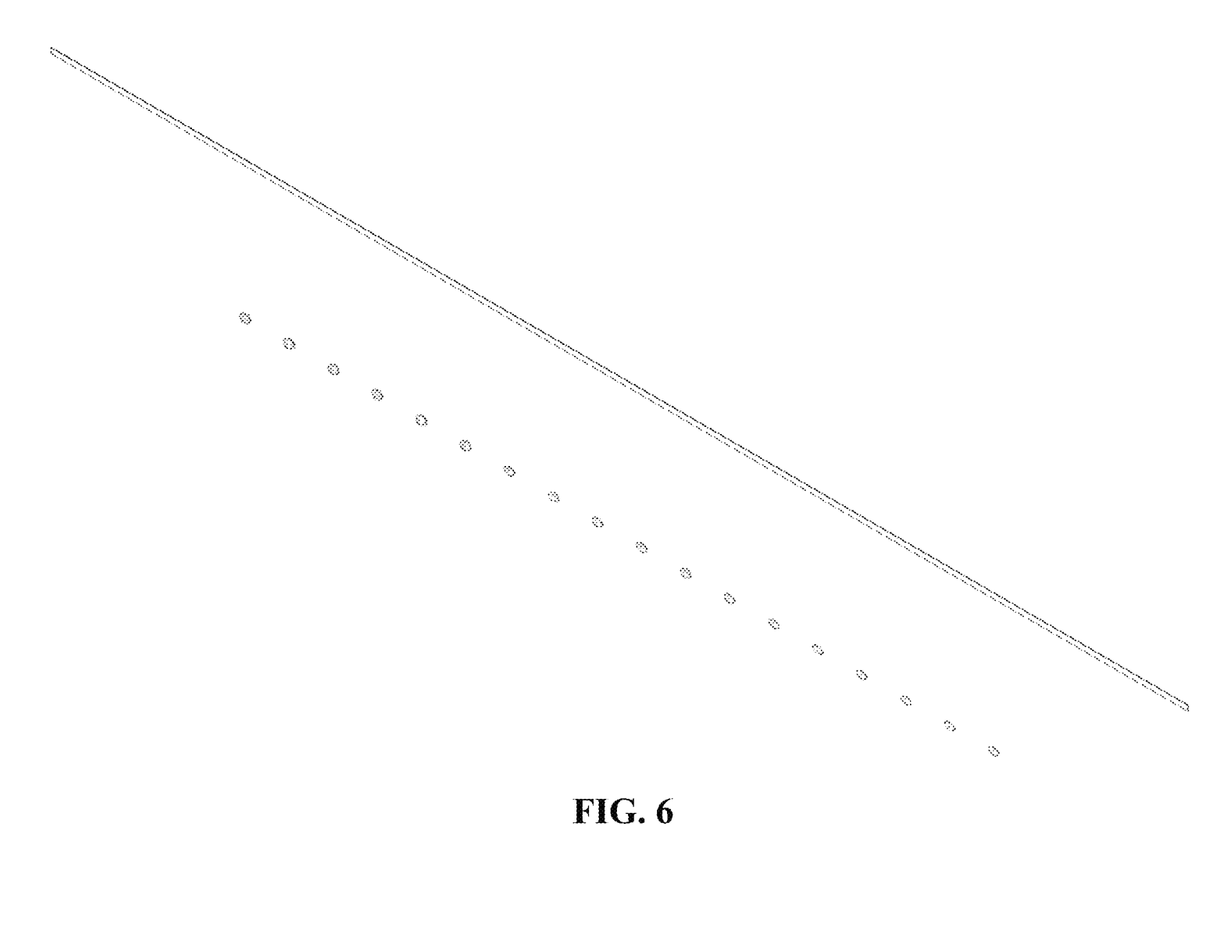
FIG. 6 is an exploded view of the ridged dental floss in FIG. 1.

In preferred embodiments, each of the spherical ridges 110*a-r* on the first, second, and third sections are made of hypoallergenic silicone that is operable to elastically deform in shape and/or size and spring back to its static shape after a compression force generated from a user's teeth is removed therefrom. Each of the spherical ridges 110*a-r* may be sonically welded or heat welded to the string 102 to provide a secure coupling configuration thereto. In other embodiments, each ridge 110*a-r* may be selectively adhered to the dental floss string, as exemplified with the exploded view in FIG. 6.

Beneficially, the dental floss string 102 also includes a second section 108 *b* along the string length with a tightly spaced series of spherical ridges 110 *g-l* that are also each of an elastic polymeric material and directly coupled to opposing sides of the dental floss string 102 to define a diameter. The diameters of each of the tightly spaced series of spherical ridges 110 *g-l* in the second section 108 *b*, however, are greater than the diameters of each of the tightly spaced series of spherical ridges 110 *a-f* in the first section 108 *a*. Continuing further, the dental floss string 102 also includes a third section 108 *c* along the string length with a tightly spaced series of spherical ridges 110 *m-r* that are each of an elastic polymeric material and also directly coupled to opposing sides of the dental floss string 102 to define a diameter. The diameters of each of the tightly spaced series of spherical ridges 110 *m-r* in the third section 108 *c* are greater than the diameters of each of the tightly spaced series of spherical ridges 110 *g-l* in the second section 108 *b*. Said differently, the ridges increase in size in each section and in the longitudinal direction during any given segment. This beneficially provides a user with different ridge thicknesses depending on the user's teeth spacing and sizing. The first, second, and third sections 108 *a-c* are each respectively adjacent to at least one other section (as shown in the figures). As illustrated best in FIGS. 2-4, each of the ridges in the respective first, second, and third sections 108*a-c* are of the same diameter and the ridges in each section get progressively larger along the dental floss string 102.

Figure 3:
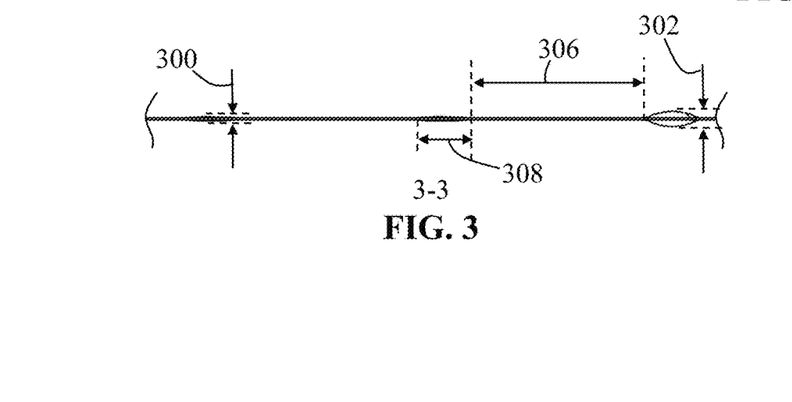
FIG. 3 is a close-up view of section 3-3 of the ridged dental floss in FIG. 2.
Figure 4:
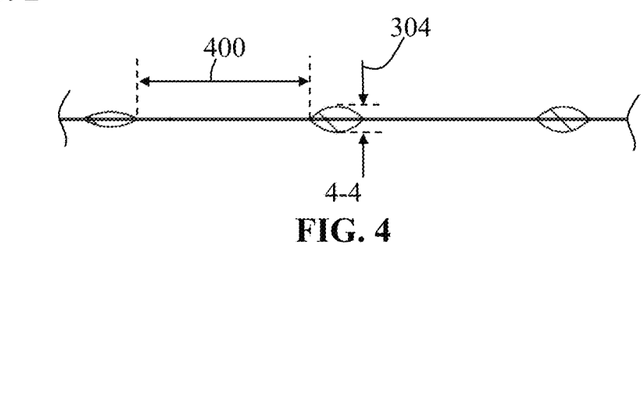
FIG. 4 is a close-up view of section 4-4 of the ridged dental floss in FIG. 2.
Figure 5:
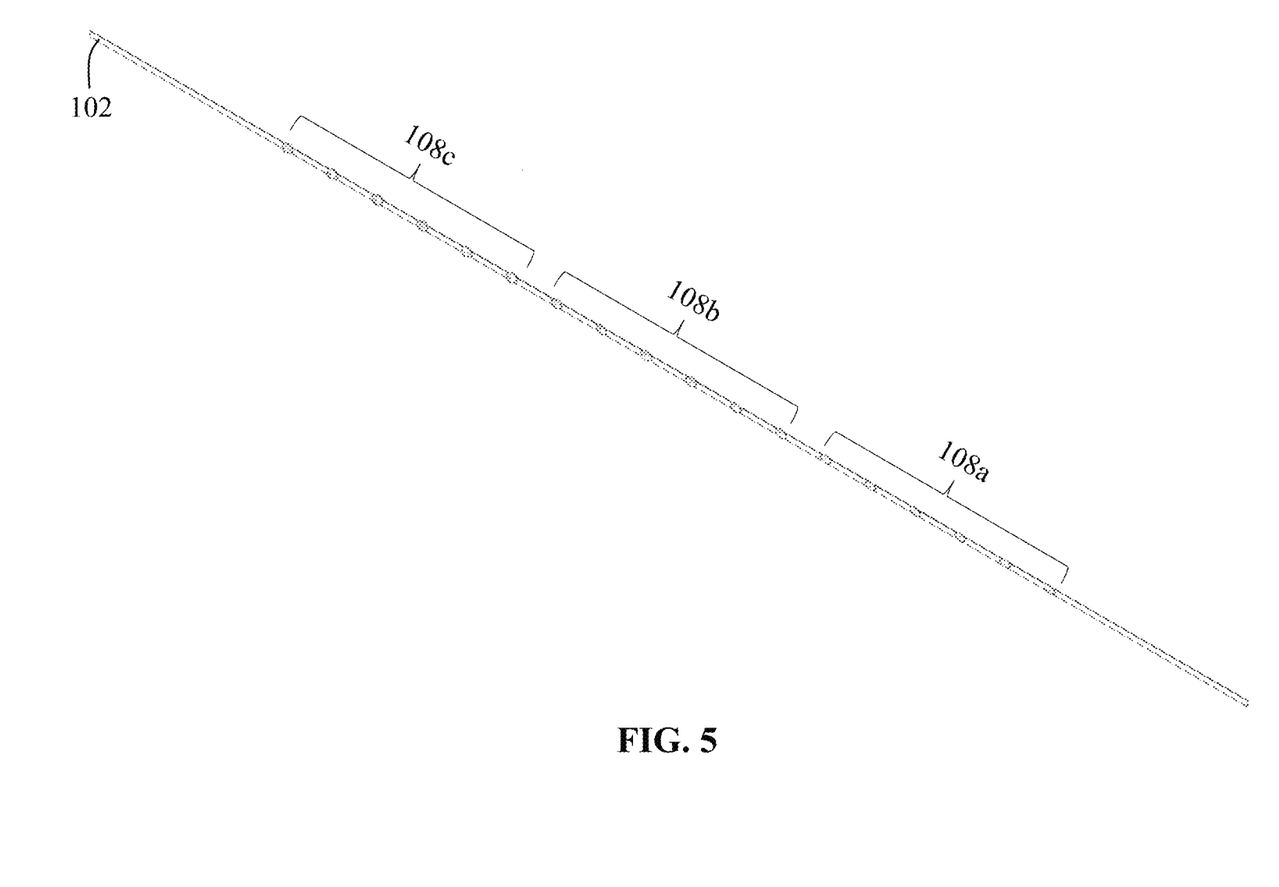
FIG. 5 is a perspective view of the ridged dental floss in FIG. 1.

As best seen in FIGS. 3-4 and using diameters 300, 302, and 304 as an example, the diameters 300 of each of the tightly spaced series of spherical ridges 110*a-f* in the first section 108*a* range from 0.05-0.50 mm, wherein approximately 0.25 is the preferred diameter. The diameters 302 of each of the tightly spaced series of spherical ridges 110*g-l* in the second section 108*b* range from 0.63-1.13 mm, wherein approximately 0.88 is the preferred diameter. The diameters 304 of each of the tightly spaced series of spherical ridges 110*m-r* in the third section 108*c* range from 1.25-1.75 mm, wherein approximately 1.5 is the preferred diameter. The diameter is considered the length between the two outer points of a ridge defined on both sides of the string 102 and is, in most instances, but not necessarily, a distance between the mid-point of each ridge 110. To maximize the compactness of the dental floss roll while housed in the container and provide a segment that effectively cleans a user's teeth on a single pass, the first, second, and third sections 108*a-c* each have a range between three to six tightly spaced spherical ridges 110*a-r* directly coupled to opposing sides of the dental floss string 102. To that end, each ridge is also preferably spaced 10-15 mm from one another, e.g., "tightly", wherein 12 mm is preferred to accommodate most teeth and preserve dental floss string 102 material. The first, second, and third sections 108*a-c* may also be beneficially spaced 20-30 mm from one another, wherein 25 mm is preferred, to provide visual and physical demarcation cues to the user where one sections ends and another begins, i.e., arrows 306, 400 in FIGS. 3-4 represent exemplary spacing between the sections 108*a-c*. Additionally, each ridge is also preferably (and uniformly) a longitudinal width (see, e.g., width 308) ranging from 2.5-3.5 mm.

In one embodiment, every segment beneficially includes two opposing lines of demarcation 112, 114 that define a first flossing segment forming a portion of a plurality of flossing segments formed on the roll of flexible dental floss string 102. The lines of demarcation may be a solid color indicating where the user is to tear the floss string with the metallic prong on the floss container and/or may be a series of indentations or perforations facilitating in the release of each individual segment. Said another way, two opposing lines of demarcation 112, 114 can be seen flanking the first, second, and third sections, or on opposing sides of ridged sections, to prevent an excess amount of floss being utilized. In one embodiment, each of the two opposing lines of demarcation 112, 114 are spatially offset a length of at least 40 mm from any one of the first, second, and third sections, wherein approximately 51 mm is preferred. The spatial offset enables a user to effectively hold onto the segment while enabling the ridges a-r to pass through a user's teeth if desired.

In another embodiment, the present invention, the diameters of each of the tightly spaced series of spherical ridges 110a-f in the first section 108a get progressively larger for each spherical ridge in the series (e.g., 1-10% larger) to provide a user the desired ridge thickness for teeth spacing. To that end, the series of spherical ridges 110a-f in the first section 108a get progressively larger up until the diameter in the second section, wherein the diameters of each of the tightly spaced series of spherical ridges 110g-l in the second section 108b get progressively larger for each spherical ridge in the series, and the diameters of each of the tightly spaced series of spherical ridges 110m-r in the third section 108c get progressively larger for each spherical ridge in the series. This provides the most versatile ridged floss assembly with respect to accommodating teeth spacing, but comes with the disadvantage of increases in production.

Although a specific order of executing the process steps has been discussed and shown, the order of executing the steps may be changed relative to the order shown in certain embodiments. Also, two or more steps shown or described as occurring in succession may be executed concurrently or with partial concurrence in some embodiments. Certain steps may also be omitted in for the sake of brevity. In some embodiments, some or all of the process steps can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features. For example, FIG. 8 also depicts perspective views of a handheld floss member having a piece of ridged floss in accordance with one embodiment of the present invention, wherein the handheld floss body can be seen having a ridge disposed thereon, wherein it is envisions that a pack of handheld floss bodies can be made with varying diameters of ridges coupled thereto, wherein the diameter sizes can be demarcated by a particular color.

What is claimed is:

1. In combination with a dental floss container housing a roll of flexible dental floss string having a distal end, a proximal end opposing the distal end of the dental floss string, and a string length separating the distal and proximal ends of the dental floss string, the improvement comprising:
   a first section along the string length with a tightly spaced series of spherical ridges each of an elastic polymeric material and directly coupled to opposing sides of the dental floss string to define a diameter, wherein the tightly spaced series of spherical ridges in the first section are of the same diameter;
   a second section along the string length with a tightly spaced series of spherical ridges each of an elastic polymeric material and directly coupled to the opposing sides of the dental floss string to define a diameter, wherein the diameters of each of the tightly spaced series of spherical ridges in the second section are of the same diameter and are each greater than the diameters of each of the tightly spaced series of spherical ridges in the first section; and
   a third section along the string length with a tightly spaced series of spherical ridges each of an elastic polymeric material and directly coupled to the opposing sides of the dental floss string to define a diameter, wherein the diameters of each of the tightly spaced series of spherical ridges in the third section are of the same diameter and are each greater than the diameters of each of the tightly spaced series of spherical ridges in the first and second sections, the first, second, and third sections are adjacent to at least one of each other, the second section is interposed between the first and third sections.

2. The improvement according to claim 1, further comprising:
   two opposing lines of demarcation flanking the first, second, and third sections.

3. The improvement according to claim 2, wherein:
   each of the two opposing lines of demarcation are spatially offset a length of at least 40 mm from any one of the first, second, and third sections.

4. The improvement according to claim 2, wherein:
   the two opposing lines of demarcation define a first flossing segment forming a portion of a plurality of flossing segments formed on the roll of flexible dental floss string.

5. The improvement according to claim 1, wherein:
   the diameters of each of the tightly spaced series of spherical ridges in the first section range from 0.05-50 mm, the diameters of each of the tightly spaced series of spherical ridges in the second section range from 0.63-1.13 mm, and the diameters of each of the tightly spaced series of spherical ridges in the third section range from 1.25-1.75 mm.

6. The improvement according to claim 1, wherein:
   the first, second, and third sections each have six tightly spaced spherical ridges directly coupled to the opposing sides of the dental floss string.

7. The improvement according to claim 6, wherein:
   the six spherical ridges are tightly spaced 10-15 mm from one another.

8. The improvement according to claim 1, wherein:
   the first, second, and third sections are spaced 20-30 mm from one another.

9. The improvement according to claim 1, wherein:
   the spherical ridges on the first, second, and third sections are each of hypoallergenic silicone.

10. A ridged dental floss comprising:
    a flexible dental floss string of a polymeric material and having a distal end, a proximal end opposing the distal end of the dental floss string, and a string length separating the distal and proximal ends of the dental floss string;
    a first section along the string length with a tightly spaced series of spherical ridges each of an elastic polymeric material and directly coupled to opposing sides of the dental floss string to define a diameter, wherein the tightly spaced series of spherical ridges in the first section are of the same diameter; and
    a second section along the string length with a tightly spaced series of spherical ridges each of an elastic polymeric material and directly coupled to the opposing sides of the dental floss string to define a diameter, wherein the diameters of each of the tightly spaced series of spherical ridges in the second section are of the same diameter and are each greater than the diameters of each of the tightly spaced series of spherical ridges in the first section and the first and second sections are disposed in an adjacent configuration with one another.

11. The ridged dental floss according to claim 10, further comprising:
    a third section along the string length with a tightly spaced series of spherical ridges each of an elastic polymeric material and directly coupled to the opposing sides of the dental floss string to define a diameter, wherein the diameters of each of the tightly spaced series of spherical ridges in the third section are of the same diameter and are each greater than the diameters of each of the tightly spaced series of spherical ridges in the first and second sections, the first, second, and third sections are adjacent to at least one of each other, and the second section is interposed between the first and third sections.

12. The ridged dental floss according to claim 11, wherein:
the spherical ridges on the first, second, and third sections are each of hypoallergenic silicone.

13. The ridged dental floss according to claim 12, wherein:
the diameters of each of the tightly spaced series of spherical ridges in the first section range from 0.05-50 mm, the diameters of each of the tightly spaced series of spherical ridges in the second section range from 0.63-1.13 mm, and the diameters of each of the tightly spaced series of spherical ridges in the third section range from 1.25-1.75 mm.

14. The ridged dental floss according to claim 10, further comprising:
two opposing lines of demarcation flanking the first and second sections.

15. The ridged dental floss according to claim 14, wherein:
each of the two opposing lines of demarcation are spatially offset a length of at least 40 mm from any one of the first and second sections.

16. The ridged dental floss according to claim 14, wherein:
the two opposing lines of demarcation define a first flossing segment forming a portion of a plurality of flossing segments formed on the dental floss string.

* * * * *